G. A. ENSIGN.
ASSEMBLING MACHINE.
APPLICATION FILED FEB. 17, 1912.

1,040,910.

Patented Oct. 8, 1912.
6 SHEETS—SHEET 1.

WITNESSES
Edward Thorpe
Rudy. Hoster

INVENTOR
George A. Ensign
BY
Munn & Co
ATTORNEYS

G. A. ENSIGN.
ASSEMBLING MACHINE.
APPLICATION FILED FEB. 17, 1912.

1,040,910.

Patented Oct. 8, 1912.
6 SHEETS—SHEET 4.

WITNESSES
Edward Thorpe

INVENTOR
Geo. A. Ensign
BY
Munn & Co
ATTORNEYS

G. A. ENSIGN.
ASSEMBLING MACHINE.
APPLICATION FILED FEB. 17, 1912.

1,040,910.

Patented Oct. 8, 1912.
6 SHEETS—SHEET 5.

WITNESSES
Edward Thorpe
[signature]

INVENTOR
George A. Ensign
BY
Munn & Co
ATTORNEYS

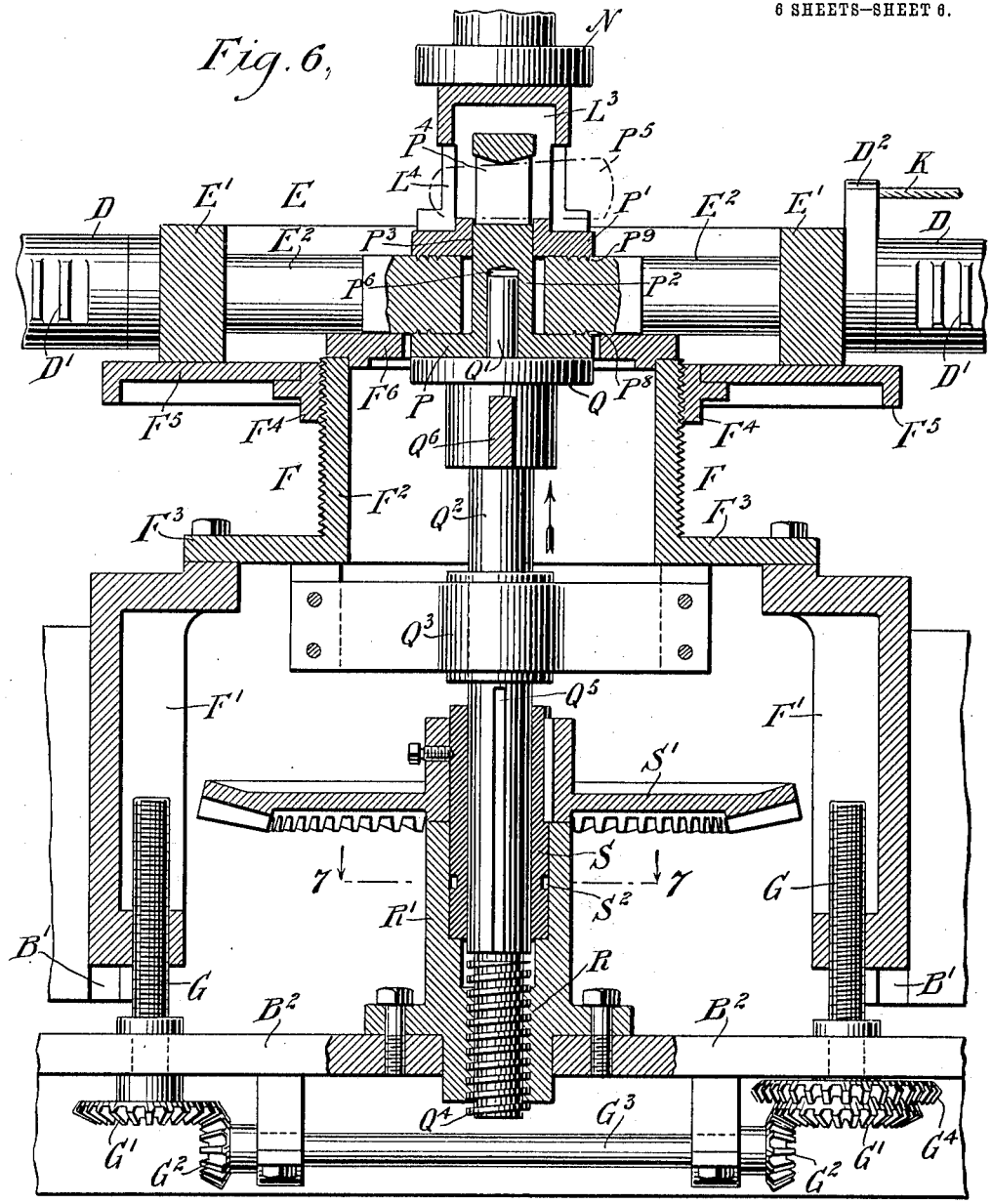
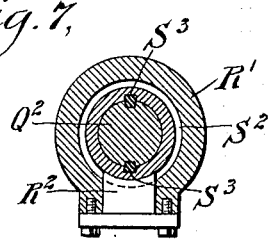

UNITED STATES PATENT OFFICE.

GEORGE A. ENSIGN, OF DEFIANCE, OHIO, ASSIGNOR TO DEFIANCE MACHINE WORKS, OF DEFIANCE, OHIO.

ASSEMBLING-MACHINE.

1,040,910.  Specification of Letters Patent.  Patented Oct. 8, 1912.

Application filed February 17, 1912. Serial No. 678,251.

*To all whom it may concern:*

Be it known that I, GEORGE A. ENSIGN, a citizen of the United States, and a resident of Defiance, in the county of Defiance and State of Ohio, have invented a new and Improved Assembling-Machine, of which the following is a full, clear, and exact description.

The object of the invention is to provide a new and improved assembling machine, more especially designed for assembling the sections of wooden wheels such as are used for automobiles and other vehicles, the machine being arranged to insure an accurate and quick assembling of the wheel parts with a view to form a true wheel and to provide the wheel parts with a false or a temporary hub to hold the parts together until a tire is placed on the rim. For the purpose mentioned, use is made of a series of radially-disposed presser devices for engagement with the rim of the wheel sections, and positive means connected with the said presser devices to cause the same to move in unison. Use is also made of presser devices disposed vertically for pressing the clamping members of a false or a temporary hub in engagement with the inner ends of the spokes of the wheel sections after the same are assembled, and to allow of fastening the said clamping members together to hold the wheel sections in position until a tire is placed around the rim of the wheel.

A practical embodiment of the invention is represented in the accompanying drawings forming a part of this specification, in which similar characters of reference indicate corresponding parts in all the views.

Figure 1:
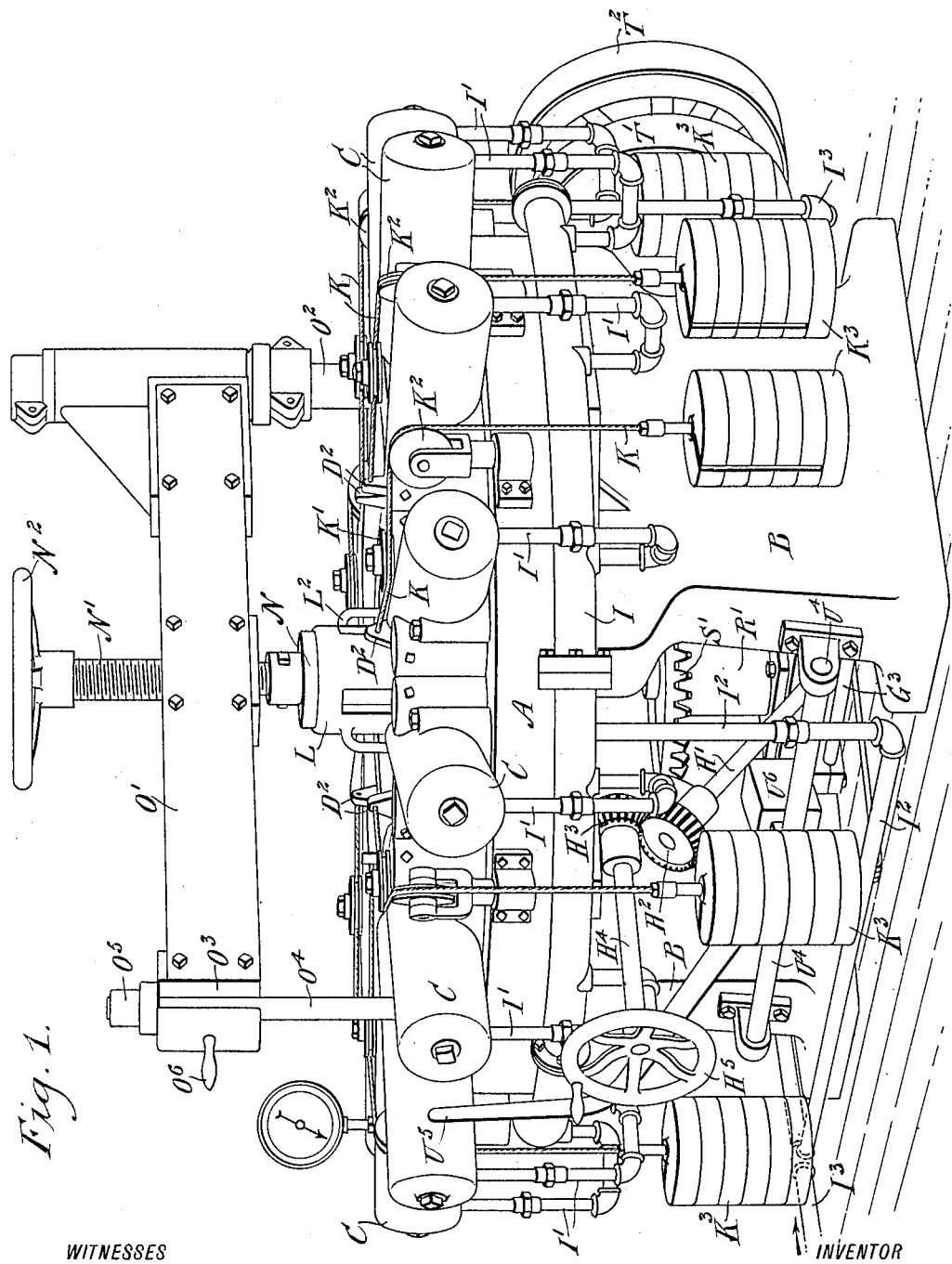
Figure 2:
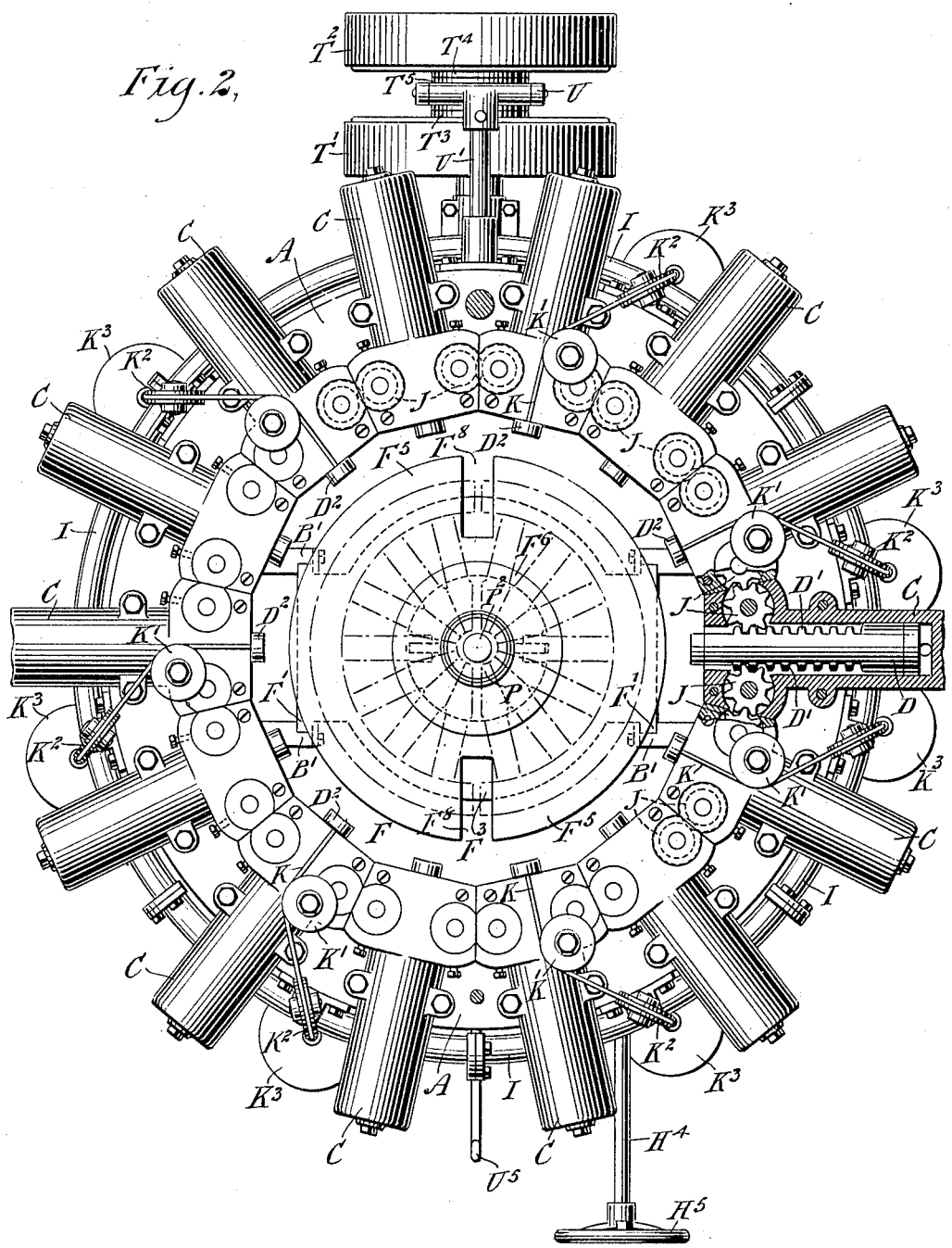
Figure 3:
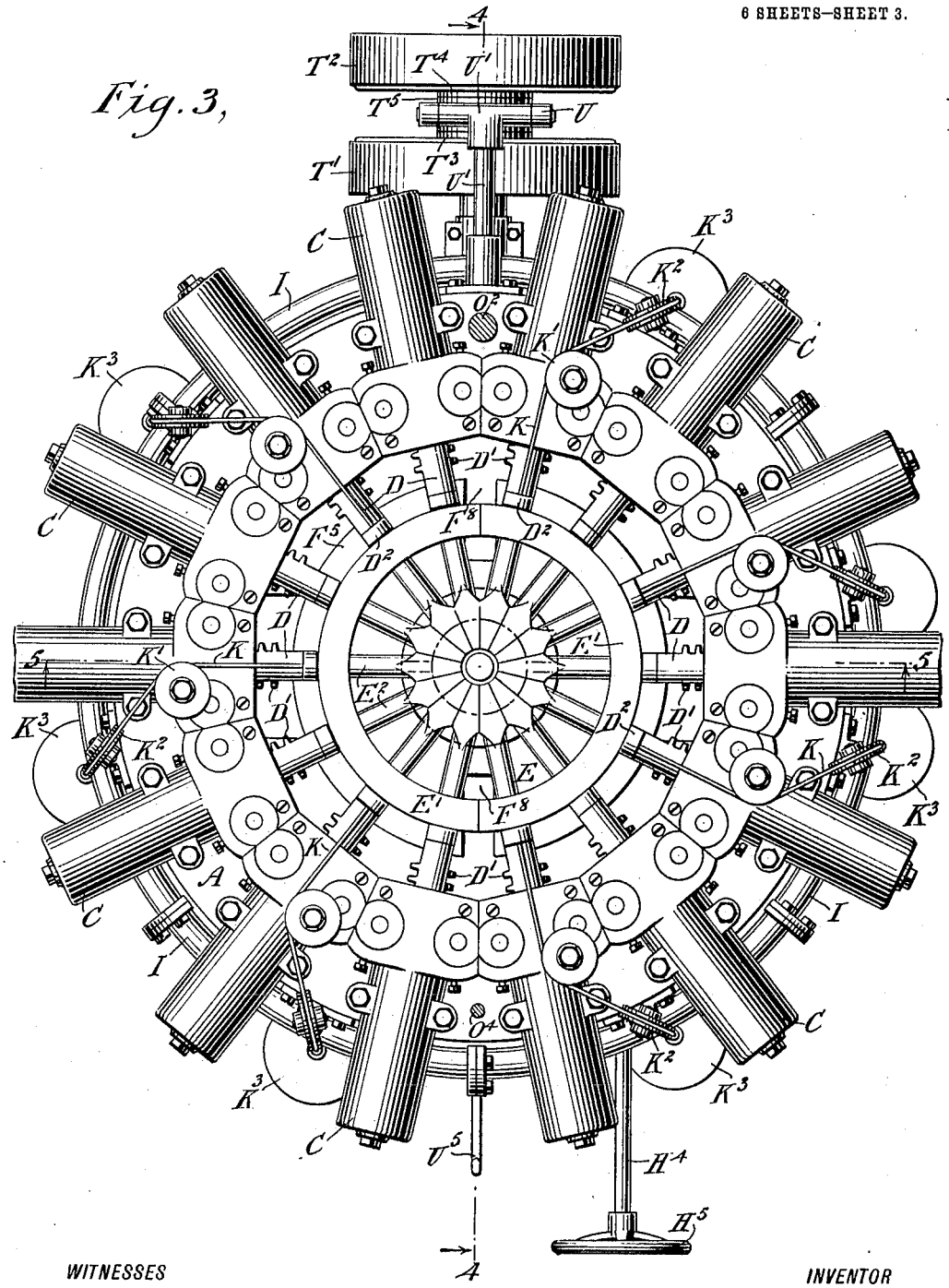
Figure 4:
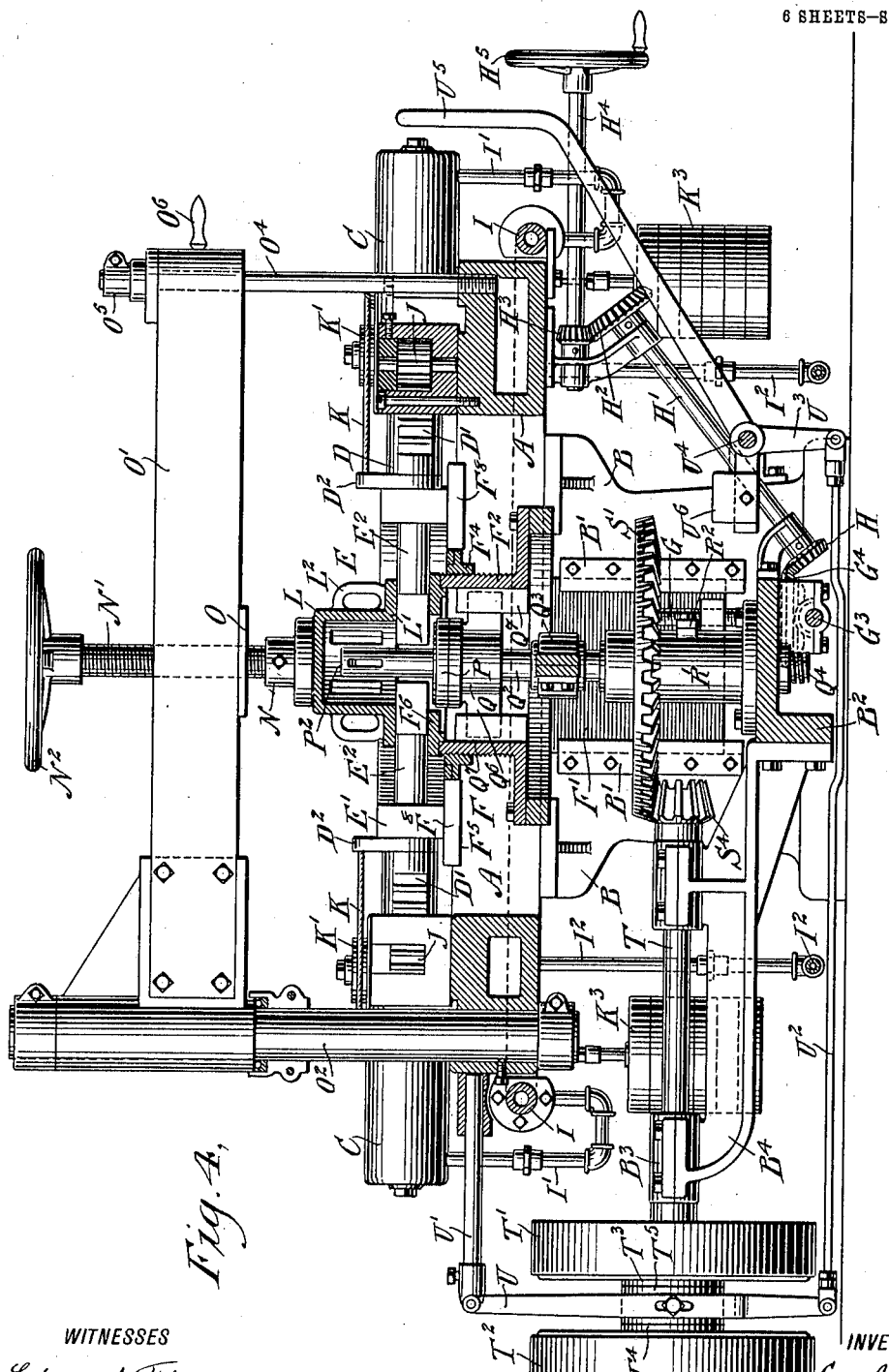
Figure 10:
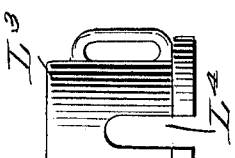
Figure 9:
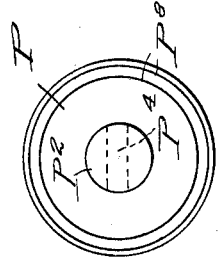
Figure 8:
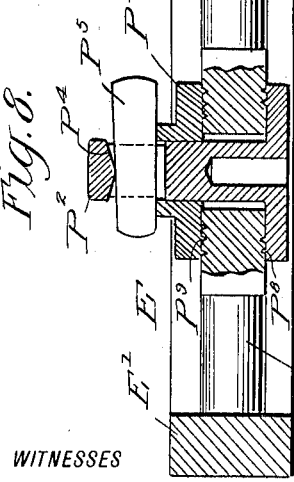
Figure 5:
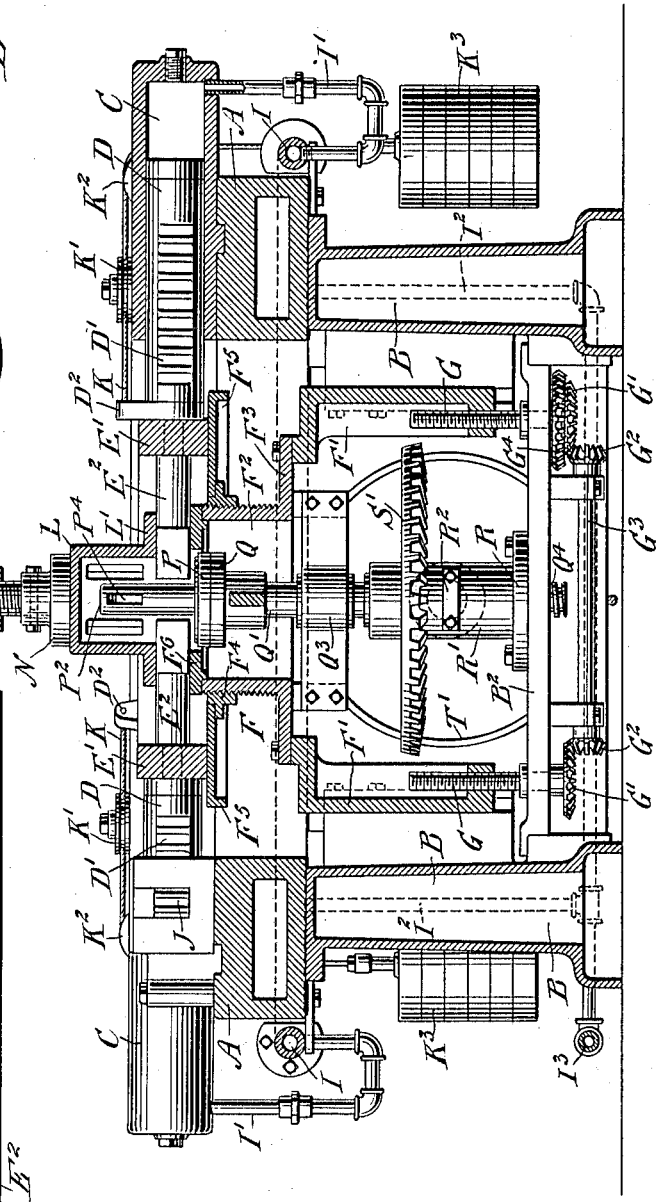

Figure 1 is a perspective view of an assembling machine; Fig. 2 is a plan view of the same, parts being in section and the presser devices being in withdrawn position; Fig. 3 is a similar view of the same showing the wheel sections in position in the machine and the presser devices in engagement therewith to assemble the wheel sections for forming a true wheel; Fig. 4 is a vertical section of the assembling machine on the line 4—4 of Fig. 3 parts being shown in elevation; Fig. 5 is a cross section of the same on the line 5—5 of Fig. 3 parts being shown in elevation; Fig 6 is an enlarged cross section of the same and showing the clamping members of the false hub in position on the inner ends of the spokes; Fig. 7 is a sectional plan view of part of the same on the line 7—7 of Fig. 6; Fig. 8 is an enlarged sectional side elevation of the wheel sections in assembled position and held in place by a false or a temporary hub; Fig. 9 is a plan view of a bottom clamping member of the false hub; and Fig. 10 is a side elevation of the head for engagement with the top clamping member of the false or temporary hub.

The improved assembling machine is mounted on a circular frame A held on standards or legs B, B adapted to rest on the floor or other support. On top of the frame A are mounted a series of radially-disposed presser devices, preferably in the form of hydraulic rams having cylinders C secured to the said frame A and containing pistons D adapted to engage the peripheral face of the rim E' of the wheel E made in two, three, four or more sections, to be assembled or pressed together with a view to form a true wheel. The wheel E is supported on a table F having depending slides F' mounted to slide in vertical guideways B' formed on the inner faces of the legs B, as plainly indicated in Figs. 5 and 6. Screw rods G screw in the slides F' and are mounted to turn on a cross bar B² connecting the legs B with each other. The lower ends of the screw rods G are provided with bevel gear wheels G' in mesh with bevel pinions G² secured on a shaft G³ journaled in suitable bearings arranged on the cross bar B², and on one of the screw rods G is secured a gear wheel G⁴ in mesh with a pinion H (see Fig. 4) secured on the lower end of an inclined shaft H' journaled in suitable bearings arranged on one of the legs B of the frame A. On the upper end of the shaft H' is secured a bevel gear wheel H² in mesh with a pinion H³ secured on a horizontally-disposed shaft H⁴ journaled on the frame A and carrying at its outer end a hand wheel H⁵ under the control of the operator for turning the shaft H⁴ so as to rotate the shaft H' by the pinion H³ and the gear wheel H⁴. The rotary motion given to the shaft H' is transmitted by the pinion H and the gear wheel G⁴ to one of the screw rods G, and a similar rotary motion is transmitted to the other screw rod G by the connecting gearing consisting of the gear wheels G', G² and the shaft G³. Thus when the screw rods G are rotated the slides F' are raised or lowered according to the direction in which the hand wheel H⁵ is turned so that the table F supporting the wheel E is raised or lowered to bring the axes of the pistons D approximately to the middle of the width of the rim E′ and into the same plane of the axes of the spokes E² of the wheel. The table F is provided with a cylindrical neck F² provided at its lower end with a flange F³ to which the slides F′ are bolted or otherwise secured, and the said neck F² is provided with an exterior screw thread on which screws the hub F⁴ of a table top F⁵ on which rests the rim E′ of the wheel E. The spokes E² of the wheel E are supported on top of a central apertured plate F⁶ fitting onto the top of the neck F² of the table F, it being understood that the table top F⁵ can be screwed up or down on the neck F² to accommodate wheels in which the width of the rim E′ varies so that the rim E′ is properly supported on the table top F⁵, and the inner ends of the spokes E² rest flat on the center plate F⁶.

The outer ends of the cylinders C are connected by branch pipes I′ with an annular supply pipe I supported on the frame A and connected by pipes I² with a pipe I³ leading to a pump or other means for supplying the outer ends of the cylinders C with oil or other liquid under pressure so as to force the pistons D inward toward a common center which is also the center of the wheel E.

In order to press the wheel sections uniformly together with a view to form an absolutely true wheel it is necessary that the pistons D move in unison, and for this purpose positive gearing means are employed, arranged as follows: Each of the pistons D is provided on opposite sides with racks D′ each engaged by a gear wheel J mounted to turn in suitable bearings arranged on the corresponding cylinder C and adjacent gear wheels J are in mesh with each other, as plainly shown in Fig. 2, so that all the pistons D are connected with each other by the gear wheels J and the racks D′ to cause the said pistons D to move in unison when pressure is applied to the outer ends of the said pistons D. Thus all the pistons D move in unison and in a radial direction and consequently engage the peripheral face of the rim of the wheel sections to exert a pressure on the said wheel sections uniformly and in the direction of the center of the wheel so that the wheel sections are pressed together with a view of forming a true wheel.

It is understood that the spokes E² are tapered at their inner sides (see Fig. 3) so that the said sides abut against each other when the wheel sections are finally assembled under pressure of the pistons D moving in unison. It is further understood that by the arrangement described a positive means is provided for causing the pistons D to move in unison with a view to accomplish the desired result above mentioned.

In order to return the pistons D into outermost position at the time the liquid is pumped out of the cylinder C use is made of ropes or cables K attached at one end to upwardly-extending lugs D² arranged on the inner ends of some of the pistons D, preferably every alternate piston, as indicated in the drawings. Each rope or cable K passes around guide pulleys K′, K² and supports a weight K³, so that when the oil or other liquid is pumped out of the cylinders C the weights K³ pull against the corresponding pistons D in an outward direction and as the several pistons are geared with each other it is evident that all the pistons move simultaneously into an outward position. It will also be noticed that the cables K exert an upward pull on the pistons D to prevent the same from sagging when moving into outermost position. As shown, the guide pulleys K′ are disposed horizontally and journaled on the top of the corresponding cylinders C while the guide pulleys K² are disposed vertically and are supported from the frame A.

In order to prevent the inner ends of the spokes E from moving upward during the time the wheel sections are subjected to pressure as described, use is made of a guide head L provided at its lower end with an outwardly-extending flange L′ adapted to rest on the top of the inner ends of the spokes E² directly opposite the center plate F⁶ of the table F, as plainly shown in Fig. 4. The guide head L is provided with handles L² to permit of conveniently placing the head in position on the inner ends of the spokes E² or removing the head from the said spokes. The top of the head L is adapted to be engaged by a collar N secured to the lower end of a screw rod N′ extending vertically and provided on its upper end with a hand wheel N² under the control of the operator. The screw rod N′ screws in a nut O held in an arm O′ mounted to swing horizontally on a post O² attached to the frame A so that the arm O′ can be swung to one side to permit of placing the head L in position on the spokes or removing it therefrom. The free end of the arm O′ is provided in one side with a slot O³ adapted to engage a vertical rod O⁴ attached to the frame A, and on the upper end of the said rod O⁴ is secured a collar O⁵ adapted to engage the top of the free end of the arm O′ to hold the latter against upward movement during the time the screw rod N′ is screwed downward so as to engage the collar N with the head L to prevent upward movement of the latter and consequently of the inner ends of the spokes E². The free end of the arm O′ is provided with a handle O⁶ to permit of conveniently swinging the arm O' to one side into inactive position or into active position with the axis of the screw rod N' coinciding with the axis of the wheel.

A false or temporary hub is attached to the inner ends of the spokes E² after the wheel sections are assembled and while the said sections are still under the pressure of the pistons D. The false hub consists of bottom and top clamping members P, P', of which the bottom clamping member P is provided with a central shank P² adapted to pass through a central aperture P³ in the top clamping member P', and the upper end of the said shank P² passes into a hollow head L³ seated on the top of the clamping member P' and similar to the head L previously mentioned. The upper end of the shank P² is provided with an opening P⁴ for the reception of a key P⁵ adapted to be driven through openings L⁴ in the head L³ to engage the shank P² and thus lock the clamping members P and P' together, one on the bottom and one on the top of the inner ends of the spokes E², as plainly indicated in Figs. 6 and 8. The upper face of the clamping member P is provided with annular ribs P⁸ having sharp edges at the top to engage the under side of the inner ends of the spokes E², and similar ribs P⁹ are formed on the under side of the clamping member P' to engage the top of the inner ends of the spokes E².

In order to force the clamping members P and P' toward each other to embed the ribs P⁸ and P⁹ in the spokes E² the following arrangement is made: The top of the head L³ is adapted to be engaged by the collar N on the lower end of the screw rod N' so that when the latter is screwed downward the collar N exerts a pressure on the head L³ and forces the same downward thus causing the ribs P⁹ to embed themselves in the spokes E². The clamping member P is seated on a head Q provided with an upwardly-extending central pin Q' engaging a central opening P⁶ in the clamping member P and its shank P² (see Fig. 6), and the head Q is held on a vertical rod Q² mounted to slide vertically in a bearing Q³ attached to the under side of the neck F² of the table F. The lower end of the rod Q² is provided with a screw thread Q⁴ screwing in a nut R bolted or otherwise fastened to the cross bar B² of the legs B previously mentioned. The nut R is provided with a cylindrical extension R' in which is mounted to turn a sleeve S on which is secured a bevel gear wheel S', and the said hub S is provided with an annular groove S² (see Figs. 6 and 7) engaged by a pin R² attached to the extension R' of the nut R to hold the hub S against vertical movement but to allow turning of the same in the extension R'. The head S is further provided with keys S³ slidingly engaging vertical keyways Q⁵ formed in the rod Q² (see Fig. 6) so that when the hub S is turned a turning motion is given to the rod Q² to cause the latter to move up or down owing to the threaded portion Q⁴ screwing in the nut R. Thus when the hub S is turned in one direction the rod Q² and the head Q are moved upward so as to move the clamping member P in firm engagement with the under side of the spokes E² with a view to embed the ribs P⁸ in the said spokes. When the hub S is turned in a reverse direction the rod Q² is caused to move downward to disengage the head Q from the clamping member P which had been previously locked to the clamping member P' by the wedge P⁵. The head Q is provided with wings Q⁶ slidingly engaging vertical guideways Q⁷ formed or secured on the inside of the neck F², as plainly indicated in Fig. 4. The bevel gear wheel S' is in mesh with a bevel gear wheel S⁴ (see Fig. 4) secured on the inner end of a shaft T journaled in suitable bearings B³ on a bracket B⁴ attached to the cross bar B². On the shaft T are mounted to turn loosely pulleys T' and T² connected by belts with other machinery for imparting a rotary motion to the said pulleys T' and T² in opposite directions. The pulleys T' and T² are provided at their opposite faces with clutch members T³, T⁴ adapted to be engaged by a double clutch member T⁵ mounted to turn with and to slide on the shaft T. The double clutch member T⁵ is engaged by a shifting lever U pivoted at its upper end on a rod U' supported from the frame A, and the lower end of the shifting lever U is connected by a link U² with an arm U³ secured on a shaft U⁴ journaled on one of the legs B, and on the said shaft U⁴ is secured a handle U⁵ under the control of the operator to permit the latter to shift the double clutch member T⁵ from normal position either to the right or to the left into engagement with the clutch member T³ or T⁴. Thus when it is desired to rotate the shaft T in one direction the clutch member T⁵ is moved into engagement with the clutch member T³ to transmit the rotary motion of the pulley T' by way of the clutch member T⁵ to the shaft T, and the latter by the pinion S⁴ in mesh with the gear wheel S' rotates the rod Q² to move the latter in an upward direction, and when it is desired to move the rod Q² in a downward direction the operator manipulates the handle U⁵ so as to throw the clutch member T⁵ into engagement with the clutch member T⁴. When this takes place the rotary motion of the pulley T² is transmitted by the clutch members T⁴ and T⁵ to the shaft T, that is, the latter is turned in the reverse direction from the one previously mentioned so that the rod Q² is moved in a downward direction. When the clutch member T⁵ is intermediate the clutch members T³, T⁴ then the shaft T is at a standstill while the pulleys T', T² rotate in opposite directions. The shaft U⁴ (see Figs. 1 and 4) is provided with a counterweight U⁶ which counterbalances the weight of the lever U⁵ so as to normally hold the clutch member T⁵ in intermediate dormant position, that is, out of engagement with the clutch members T³ and T⁴.

The operation is as follows: In order to place the wheel sections of the wheel E in position on the table F it is necessary to swing the arm O' to one side to permit the operator to place the bottom clamping member P in position on the head Q and to then place the wheel sections in position on the table F with the rim E' resting on the top F⁵ and the inner ends of the spokes E² resting on the center plate F⁶. The operator now places the head L in position on the top of the inner ends of the spokes E², after which the arm O' is swung back into its central position to allow of screwing the screw rod N' downward so as to engage the collar N with the top of the head L to prevent upward movement of the said head and the inner ends of the spokes, it being however understood that the spokes can move horizontally between the center plate F⁶ and the under side of the flange L'. The pump connected with the pipe I³ is now started so that the fluid under pressure passes into the outer ends of the cylinders C to force the pistons D inward in a radial direction, the pistons moving in unison owing to the gearing connecting the pistons with each other, as previously described. The inner ends of the pistons finally engage the peripheral face of the rim E' of the wheel sections and exert a pressure against the said rim E' in the direction of the center of the wheel so that the sections are forced together to provide a true wheel. When this has been done the screw rod N' is screwed upward by the operator to permit of removing the head L from the top of the spokes and to permit of placing the top clamping member P' in position on top of the spokes together with the head L³ seated on top of the clamping member P'. The screw rod N' is now screwed downward to exert a downward pressure on the head L³ and the top clamping member P' with a view to force the ribs P⁹ into engagement with the spokes. The operator now manipulates the handle U⁵ so as to cause the shaft T to rotate with a view to move the rod Q² upwardly so as to press the clamping member P in firm engagement with the under side of the spokes and at the same time embedding the ribs P⁸ in the spokes. When this has been done the key P⁵ is engaged with the shank P² and the top of the clamping member P' to lock the clamping members P and P' into clamping position on the spokes E². The operator now manipulates the handle U⁵ to cause the shaft T to rotate in the opposite direction with a view to lower the rod Q² and thus disengage the head Q from the clamping member P. The operator next turns the screw rod N' to move the same in an upward direction to permit removal of the head L³. The pump is then reversed to pump the liquid out of the cylinders C and thus allow the weights K³ to return the pistons D as the fluid recedes, thus moving the pistons out of position with the rim E' of the wheel E. The arm O' is now swung to one side to permit removal of the wheel from the machine, it being understood that the wheel sections are firmly locked together by the false or temporary hub, to allow of placing a tire onto the rim E' in the usual manner.

If on pressing the rim it is found that the rim sections do not form a true circle when the ends of the rim sections meet, then the surplus material of the rim is cut off at the meeting ends by the use of a hand-saw, and in order to permit proper cutting of the material at the meeting ends of the rim sections the table top F⁵ is provided with slots F⁸ (see Figs. 2, 3 and 4) for the free passage of the hand-saw.

Having thus described my invention, I claim as new and desire to secure by Letters Patent:

1. An assembling machine for assembling wooden wheels, comprising a series of radially-disposed cylinders, pistons movable in the said cylinders, means for controlling fluid pressure to the said cylinders to move the pistons toward a common center, and sets of gearings, each set connecting adjacent pistons with each other to cause the pistons to move in unison.

2. An assembling machine for assembling wooden wheels, comprising a series of radially-disposed cylinders, pistons movable in the said cylinders and each provided with racks, means for controlling fluid pressure to the said cylinders to move the pistons toward a common center, sets of gearings, each set connecting adjacent piston racks with each other to cause the pistons to move in unison, and weight-controlled means connected with the said pistons for returning the same on relieving the cylinders of fluid pressure.

3. An assembling machine for assembling wooden wheels, comprising a series of radially-disposed cylinders, pistons movable in the said cylinders and provided at opposite sides with racks, means for controlling fluid pressure to the said cylinders, and pairs of gear wheels between adjacent pistons, the gear wheels in a pair being in mesh with each other and with the racks of the adjacent pistons.

4. An assembling machine for assembling wooden wheels, comprising a table for supporting the wheel sections, wheel rim presser devices grouped horizontally around the table and disposed radially, the said presser devices pressing against the peripheral faces of the wheel rim sections in the direction of the center of the wheel, clamping members, of which one engages the under side of the spokes at the center of the wheel and the other engages the top of the spokes at the center of the wheel, independent presser devices for pressing the said clamping members toward each other and in firm contact with the spokes, and fastening means for fastening the said clamping members together while the wheel is held pressed by the said presser devices for the wheel rim and the said clamping members.

5. An assembling machine for assembling wooden wheels, comprising a support for supporting the wheel sections, wheel rim presser devices for pressing the wheel sections to engage the inner ends of the spokes with each other, a bottom clamping member adapted to engage the under side of the spokes at the center of the wheel, the said clamping member having an apertured shank extending through a central opening in the wheel, an apertured top clamping member resting on top of the spokes directly opposite the said bottom clamping member, the said shank passing through a central opening in the said top clamping member, presser devices for pressing the bottom clamping member upward, presser devices for pressing the top clamping member downward, and a key engaging the said shank and the said top clamping member to lock the same together while the wheel is held pressed by the presser devices for the wheel rim and the clamping members.

6. An assembling machine for assembling wooden wheels provided with a frame, a table for supporting the wheel sections to be assembled, the table being vertically adjustable on the said frame and having a tubular neck, a table top adapted to support the rim of the wheel and vertically adjustable on the said neck, and a center plate held on the said neck and adapted to support the inner ends of the spokes of the wheel.

7. An assembling machine for assembling wooden wheels provided with a frame, a table for supporting the wheel sections to be assembled, the table being vertically adjustable on the said frame and having a threaded tubular neck, a table top screwing on the said neck and adapted to support the rim of the wheel, and a center plate fitted on the said neck and adapted to support the inner ends of the spokes of the wheel.

8. An assembling machine for assembling wooden wheels, comprising a table for supporting the wheel sections to be assembled, presser devices for pressing the rim of the wheel in a direction toward the center of the wheel and holding the sections in the assembled position, a manually-controlled presser device for engagement with the top of the spokes at the center of the wheel, and power-driven means for engagement with the under side of the spokes at the center of the wheel.

9. An assembling machine for assembling wooden wheels, comprising a table for supporting the wheel sections to be assembled, presser devices for pressing the rim of the wheel in a direction toward the center of the wheel and holding the sections in the assembled position, a manually-controlled presser device for engagement with the top of the spokes at the center of the wheel, power-driven means for engagement with the under side of the spokes at the center of the wheel, the said power-driven means comprising a rod mounted to move up and down and provided with a threaded portion, and vertical keyways, a fixed nut in which screws the said threaded portion, the nut having a bearing, a sleeve mounted to turn in the said bearing and provided with an annular groove and with keys slidably engaging the said keyways, a pin in the said bearing and engaging the said annular groove, and means for rotating the said sleeve in either direction.

In testimony whereof I have signed my name to this specification in the presence of two subscribing witnesses.

GEORGE A. ENSIGN.

Witnesses:
C. H. KETTENING,
C. C. HOFFMAN.